US010435020B2

(12) United States Patent
Iyengar et al.

(10) Patent No.: US 10,435,020 B2
(45) Date of Patent: Oct. 8, 2019

(54) LANE KEEPING SUPPORT ON ROADS COVERED BY SNOW

(71) Applicant: Robert Bosch GmbH, Stuttgart (DE)

(72) Inventors: Srivathsan Sridharan Iyengar, Farmington Hills, MI (US); Peter Lacza, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 32 days.

(21) Appl. No.: 15/829,531

(22) Filed: Dec. 1, 2017

(65) Prior Publication Data

US 2019/0168751 A1 Jun. 6, 2019

(51) Int. Cl.

*G05D 1/02* (2006.01)
*B60W 30/12* (2006.01)
*G05D 1/00* (2006.01)

(52) U.S. Cl.

CPC ........... *B60W 30/12* (2013.01); *G05D 1/0061* (2013.01); *G05D 1/0246* (2013.01); *G05D 1/0278* (2013.01); *B60W 2420/42* (2013.01); *B60W 2550/12* (2013.01); *B60W 2550/14* (2013.01); *B60W 2550/22* (2013.01); *B60W 2550/30* (2013.01)

(58) Field of Classification Search

CPC ............. B60W 30/12; B60W 2420/42; B60W 2550/12; B60W 2550/14; B60W 2550/22; B60W 2550/30; G05D 1/0061; G05D 1/0246; G05D 1/0278

USPC ........................................................... 701/28

See application file for complete search history.

(56) References Cited

U.S. PATENT DOCUMENTS 8,040,248 B2 10/2011 Fridthjof
8,306,672 B2 11/2012 Nickolaou
8,436,902 B2 5/2013 Kuehnle
9,598,088 B2 3/2017 Lee et al.
9,626,572 B2 4/2017 Ishimaru et al.
2013/0211720 A1 8/2013 Niemz
2015/0379372 A1* 12/2015 Iwasaki .................... G06T 7/73 382/104
2017/0336794 A1* 11/2017 Shashua ................ G01C 21/32
2017/0371336 A1* 12/2017 Mei ..................... G05D 1/0212

* cited by examiner

*Primary Examiner* — Gertrude Arthur Jeanglaude

(74) *Attorney, Agent, or Firm* — Michael Best & Friedrich LLP

(57) ABSTRACT

A method and system for planning a trajectory for a vehicle. The system includes a camera and an electronic processor that, in conjunction, sense a road surface in front of the vehicle and determine whether the road surface is snow covered based on images from the camera. When the road surface is snow covered, the electronic processor determines whether snow ruts are present on the road surface based on the images and plans a trajectory of the vehicle based on a location of the snow ruts in the images when the snow ruts are present. The electronic processor is configured to automatically maneuver the vehicle based on the planned trajectory.

20 Claims, 3 Drawing Sheets

305 SENSE A ROAD SURFACE WITH THE CAMERA

310 ANALYZE IMAGES FROM THE CAMERA TO DETERMINE WHETHER THE ROAD SURFACE IS SNOW COVERED

315 IS THE ROAD SURFACE SNOW COVERED?

NO

320 PLAN A TRAJECTORY OF THE VEHICLE BASED ON LANE MARKINGS ON THE ROAD SURFACE

YES

325 ARE SNOW RUTS PRESENT?

NO

330 DISABLE SEMIAUTONOMOUS DRIVING

YES

335 PLAN A TRAJECTORY OF THE VEHICLE BASED ON A LOCATION OF SNOW RUTS IN THE IMAGES

340 AUTOMATICALLY MANUEVER THE VEHICLE BASED ON THE PLANNED TRAJECTORY

LANE KEEPING SUPPORT ON ROADS COVERED BY SNOW

FIELD

Embodiments relate to vehicle guidance systems.

BACKGROUND

Some modern vehicles include various vehicle guidance systems that provide semiautonomous functionality and driver assistance functionality. In some cases, the vehicle guidance systems plan a route of travel and maintain the route of travel using vehicle controls. In other cases, the vehicle guidance systems provide steering torque or other corrections to maintain travel within a particular lane of travel to assist a driver. In either of these cases, the vehicle guidance systems rely on camera images that include lane markings of the roadway. However, in inclement weather, lane markings may be obstructed within the images.

SUMMARY

Embodiments provide, among other things, a system and a method for planning a trajectory for a vehicle in inclement weather, and in particular when the roadway is snow covered. The trajectory may be planned based on whether snow ruts (i.e., tire tracks in the snow) are present and on the location and direction of the snow ruts. The system and method includes automated maneuvering and lane keeping support (i.e., lane keeping assist) that are configured to keep the vehicle driving within the snow ruts. These functions can increase the stability of the vehicle 100 when driving in snow.

One embodiment provides a method of planning a trajectory for a vehicle. The method includes sensing a road surface with a camera in front of the vehicle; determining whether the road surface is snow covered based on images from the camera; when the road surface is snow covered, determining whether snow ruts are present on the road surface based on the images; and planning a trajectory of the vehicle based on a location of the snow ruts in the images when the snow ruts are present. The method further includes automatically maneuvering the vehicle, by an electronic processor, based on the planned trajectory.

Another embodiment provides a system for planning a trajectory for a vehicle. The system includes a camera positioned with a field of view of a road surface in front of the vehicle, a vehicle control device configured to automatically maneuver the vehicle, and an electronic processor communicatively coupled to the camera and the vehicle control device. The electronic processor is configured to receive images from the camera; determine whether the road surface is snow covered based on the images; when the road surface is snow covered, determine whether snow ruts are present on the road surface based on the images; and plan a trajectory of the vehicle based on a location of the snow ruts in the images when the snow ruts are present. The electronic processor is further configured to automatically maneuver the vehicle based on the planned trajectory.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

Figure 1:
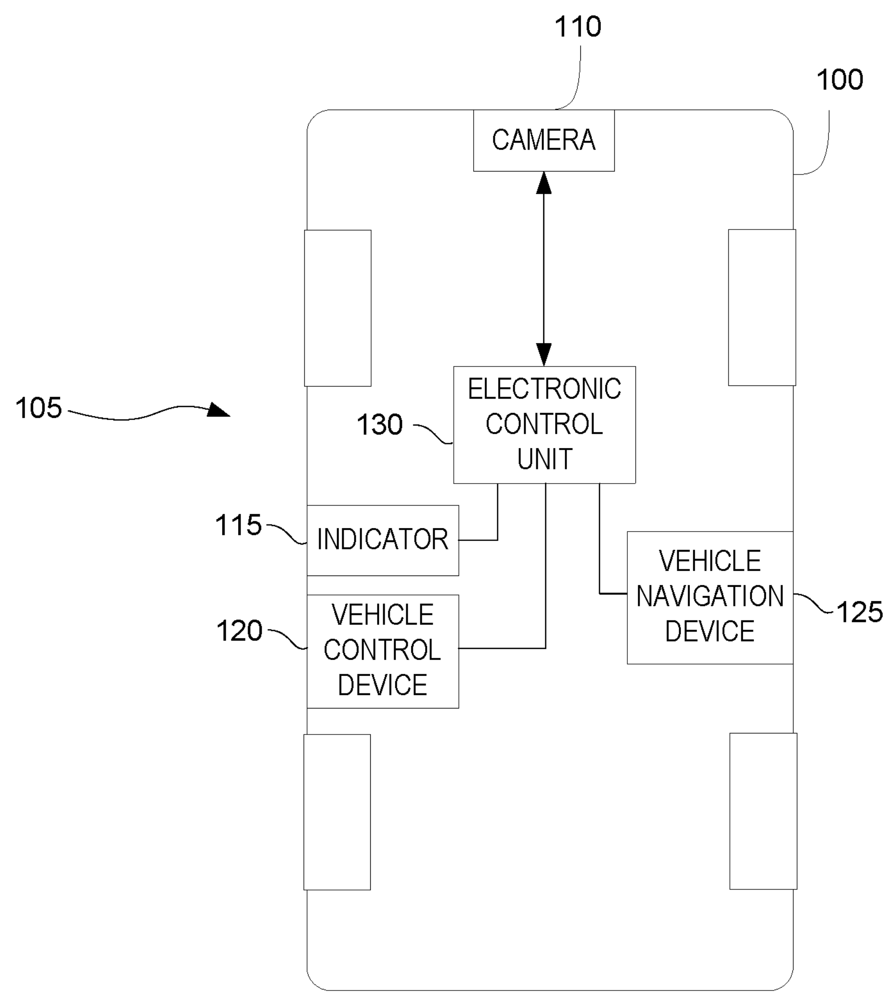
FIG. 1 is a block diagram of a vehicle equipped with a guidance system for planning a trajectory of the vehicle according to one embodiment.

FIG. 1 illustrates a vehicle 100 equipped with a vehicle guidance system 105 according to one embodiment. In the embodiment illustrated, the vehicle guidance system 105 includes a camera 110, an indicator 115, a vehicle control device 120, a vehicle navigation device 125, and electronic control unit 130. FIG. 1 provides just one example configuration of the vehicle guidance system 105. However, other configurations that provide trajectory planning are contemplated. Examples of the components illustrated in FIG. 1 are described below.

In one example, the camera 110 is a video camera that produces a series of images of the roadway for processing by the electronic control unit 130. The camera 110 may have a standard lens that produces rectilinear images or a wide-angle lens that produces wide-angle views of the roadway. Regardless of the type of camera used, images produced by the camera capture information about the current condition of the road surface being travelled. The camera 110 is positioned to have a field of view that includes the road surface in front of the vehicle 100. For example, the camera 110 may be positioned inside the vehicle 100 with a field of view of the roadway through the windshield. In another example, the camera 110 may be positioned local to the front of the vehicle 100 with a field of view that includes the road surface directly in front of the vehicle 100.

The indicator 115 is configured to provide a notification of the status of the vehicle guidance system 105. For example, the indicator 115 may be positioned on a dashboard of the vehicle 100 or other display in view of the driver. The indicator 115 may be a visual indicator such as a light or an icon on the dashboard. The indicator 115 may be configured to provide multiple different types of notifications with each type associated with a different status of the vehicle guidance system 105. For example, the indicator 115 may be one color or icon type when the vehicle guidance system 105 detects snow, another color or icon type when the vehicle guidance system 105 detects snow ruts, and yet another color or icon type when the vehicle guidance system 105 detects lane markings.

The vehicle control device 120 is configured to perform various automated maneuvers for the vehicle 100. For example, the vehicle control device 120 may be configured to control steering actuators, brake actuators, electronic throttle, and others. The vehicle control device 120 is configured to automatically control or adjust the driving parameters of the vehicle 100 based on planned trajectory of the vehicle 100. In this way, the vehicle control device 120 acts to provide semiautonomous driving for the vehicle 100. In some embodiments, the vehicle control device 120 is configured to perform lane keeping assist for a manually-driven vehicle by applying steering torque or braking pressure to keep the vehicle 100 near to the center of a traffic lane. In this instance, the vehicle control device 120 uses images produced by the camera 110 to detect the position of the vehicle 100 relative to the lane.

The vehicle navigation device 125 is configured to, among other things, determine a position of the vehicle 100 using a global positioning system (GPS). The vehicle navigation device 125 may also determine a route of travel for the vehicle 100 based on driver selections. The vehicle guidance system 105 may plan a trajectory of the vehicle 100 based, at least in part on, information received from the vehicle navigation device 125 including location information (for example, GPS coordinates), map data, roadway data, route planning, and others.

In some embodiments, the vehicle guidance system 105, the vehicle control device 120, the vehicle navigation device 125, and other systems of the vehicle 100 may be incorporated into a single electronic control unit that is configured to perform some or all of the functions of each of these components. For example, in some embodiments, the functionality of the vehicle guidance system 105 and the vehicle control device 120 are performed by the same electronic processor.

Figure 2:
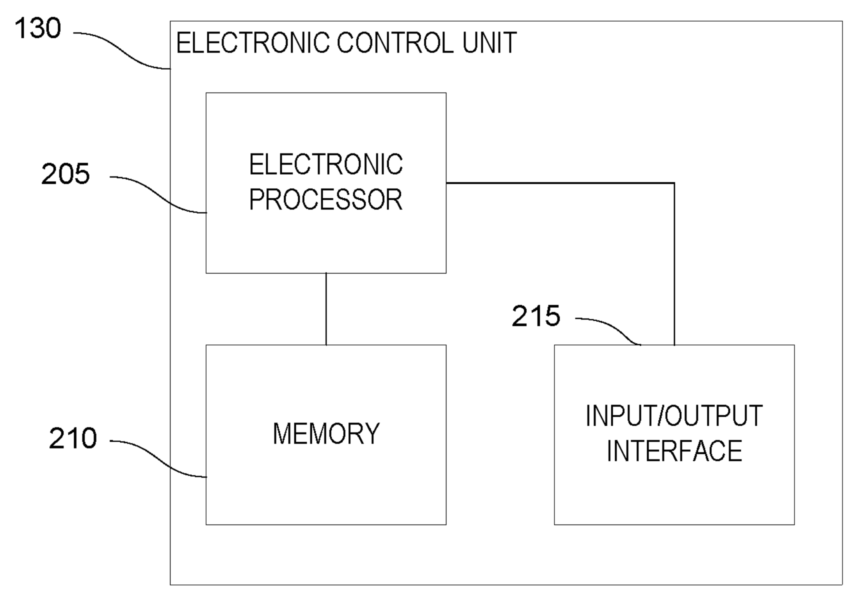
FIG. 2 is a block diagram of an electronic control unit for the vehicle of FIG. 1 according to one embodiment.

FIG. 2 is a block diagram of the electronic control unit 130 of the vehicle guidance system 105 according to one embodiment. The electronic control unit 130 includes a plurality of electrical and electronic components that provide power, operational control, and protection to the components and modules within the electronic control unit 130. The electronic control unit 130 includes, among other things, an electronic processor 205 (such as a programmable electronic microprocessor, microcontroller, or similar device), a memory 210 (for example, non-transitory, machine-readable memory), and an input/output interface 215. In some embodiments, the electronic control unit 130 includes additional, fewer, or different components.

The electronic control unit 130 may be implemented in several independently operated computing devices, modules, or cloud-based processing resources. Regardless of the specific configuration, the electronic control unit 130 is configured to manage and control the flow of information relating to the methods described below. The electronic processor 205 is configured to retrieve from memory 210 and execute, among other things, instructions related to receiving images from the camera 110, analyzing the images to detect features within the images including snow ruts and lane markings, planning a course trajectory of the vehicle 100, and generating control signals to maneuver the vehicle 100 according to the course trajectory.

Figure 3:
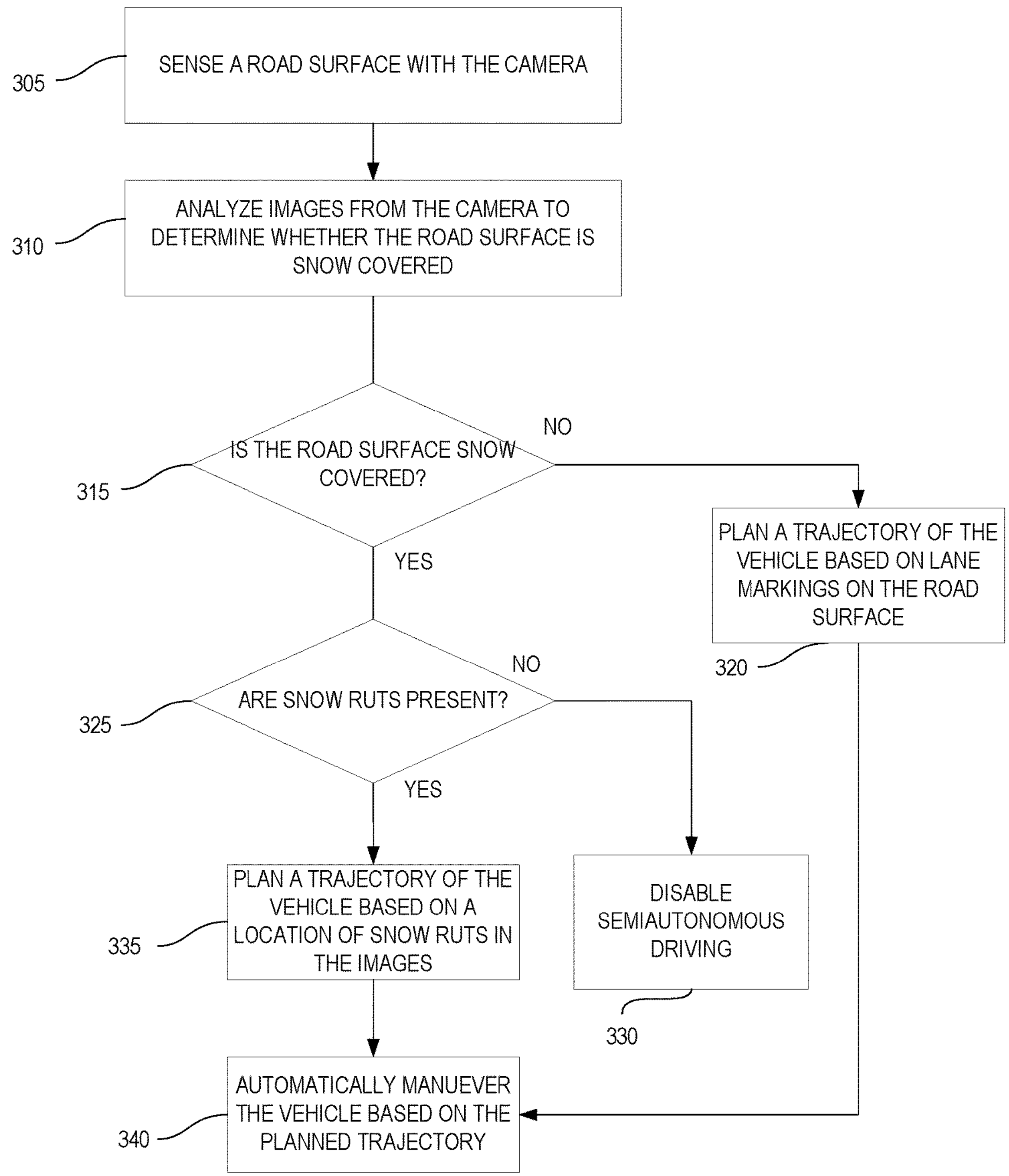
FIG. 3 is a flowchart of a method of planning a trajectory of the vehicle using the guidance system of FIG. 1 according to one embodiment.

FIG. 3 illustrates a flowchart of a method of planning a trajectory of the vehicle 100 using the vehicle guidance system 105 according to one example. In the example, the electronic processor 205 first senses a road surface with the camera 110 (block 305). The electronic processor 205 analyzes the images to determine whether the road surface is snow covered (block 310). In particular, the electronic processor 205 may analyze features within the image that are indicative of snow cover, namely color, reflectivity, and brightness of a road surface. Based on these features, the electronic processor 205 performs a determination of whether the road surface is snow covered or not snow covered (block 315). In some embodiments, the electronic processor 205 compares the features within the image to predetermined thresholds associated with these features, and when the features in the images exceed the predetermined thresholds, the electronic processor 205 determines that the road surface is snow covered. In some cases, the electronic processor 205 sets a flag within the electronic control unit 130 indicative of snow cover. In some embodiments, the electronic processor 205 determines that the road surface is not snow covered when the electronic processor 205 detects features within the images that indicate the presence of visible lane markings. When the road surface is not snow covered, the electronic processor 205 plans a trajectory of the vehicle 100 based on lane markings on the road surface that are present within the images (block 320).

Conversely, when the road surface is snow covered, the electronic processor 205 analyzes the images to determine whether snow ruts are present (block 325). For instance, the electronic processor 205 may detect features within the image indicative of snow ruts. In this example, the electronic processor 205 may determine a location of the road surface within the image and identify dark lines at that location within the image that are indicative of snow ruts. In some cases, the electronic processor 205 is unable to detect snow ruts even when the road surface is snow covered. In these cases, the electronic processor 205 may cease to perform trajectory planning and may disable semiautonomous driving and lane keeping assist (block 330) until snow ruts are detected on the road surface.

When snow ruts are present within the images, the electronic processor 205 plans a trajectory of the vehicle 100 based on a location and direction of snow ruts in the images (block 335). For example, the electronic processor 205 may plan the course trajectory such that the tires of the vehicle 100 are kept within the snow ruts as the vehicle 100 travels the trajectory. In this instance, the electronic processor 205 automatically maneuvers the vehicle 100 based on the planned trajectory (block 340). For example, the electronic processor 205 may apply steering torque, via, for example, steering actuators, to steer the vehicle 100 to maintain a course that follows the planned trajectory and that keeps the tires of the vehicle 100 positioned within the snow ruts.

In some embodiments, the electronic processor 205 determines vehicle control parameters including, for example, steering angle and velocity, to automatically keep the vehicle 100 following the planned trajectory and within the snow ruts. In other embodiments, the electronic processor 205 determines the course trajectory and sends the course trajectory to the vehicle control device 120 for operational control of the vehicle 100. In this instance, the vehicle control device 120 (for example, an electronic control unit that is configured to perform automated maneuvers) performs course corrections using steering, braking, and throttle inputs to keep the vehicle 100 travelling along the trajectory.

In some embodiments, the electronic control unit 130 uses the planned trajectory to perform lane keeping assist for a driver of the vehicle 100. The lane keeping assist assists a driver of the vehicle 100 to stay within a lane defined by the snow ruts. In this instance, the electronic processor 205 determines when the path of travel of the vehicle 100 is or is about to differ from the planned trajectory that is based on the snow ruts. When this occurs, the electronic processor 205 may determine a magnitude and direction of correction necessary to stay on the planned trajectory and to keep the tires of the vehicle 100 within the snow ruts. The correction may include automatic application of steering torque or differential braking. In some cases, the driver may override the automatic application of the course correction by driver inputs, such as counter steering or braking that is above a threshold.

In some embodiments, the electronic processor 205 identifies multiple snow ruts in the images. In this case, the electronic processor 205 may determine one or more primary snow ruts. The primary snow ruts define which of the multiple snow ruts that the electronic processor 205 uses for trajectory planning. In this case, the electronic processor 205 may ignore snow ruts that are secondary. For example, the electronic processor 205 may identify a snow rut associated with left-side wheels and a snow rut associated with right-side wheels created by one or more preceding vehicles. The electronic processor 205 may identify two snow ruts (for example, one right-side and one left-side) as primary when the two snow ruts are more prominent in the images than other snow ruts. For example, when two snow ruts appear darker or larger than others, the electronic processor 205 may identify, track, and flag these snow ruts as primary snow ruts. The electronic processor 205 then plans the trajectory of the vehicle 100 based on the location of primary snow ruts in the images.

In other embodiments, the electronic processor 205 identifies primary snow ruts based on preceding vehicles. For example, the electronic processor 205 may detect vehicles travelling in front of the vehicle 100 and determine which snow ruts are being generated by or being followed by the preceding vehicle 100. In this case, the electronic processor 205 identifies the primary snow ruts as the snow ruts of the preceding vehicle. When the primary snow ruts are identified, the electronic processor 205 then plans the trajectory of the vehicle 100 according to the path of the primary snow ruts as explained above.

In some embodiments, the electronic processor 205 plans the trajectory of the vehicle 100 only in an area defined by a predefined route. For example, the electronic processor 205 may receive a route selection by a driver or by the vehicle navigation device 125 that identifies a particular roadway, ramp, lane, and the like to be travelled. In this case, the electronic processor 205 plans the trajectory based on snow ruts that are contained within the predefined route. For example, the electronic processor 205 may identify primary snow ruts as ones that follow the predefined route and then base the planned trajectory on these primary snow ruts. In these cases, the electronic processor 205 may use a global positioning system (GPS) to determine a location of the vehicle 100 within the predefined route and then plan the trajectory of the vehicle 100 to not exceed a predetermined distance threshold from a known location of the road surface. In other words, the electronic processor 205 may plan the trajectory based on the snow ruts, but if the snow ruts deviate more than a predetermined distance from the predefined route, the electronic processor 205 may plan the trajectory to stay within the predefined route rather than strictly following the snow ruts.

In addition, the electronic processor 205 may generate a notification via the indicator 115 to a driver of the vehicle indicative of the operational status of the vehicle guidance system 105. For example, the notification may indicate what factors the vehicle guidance system 105 is using to plan a trajectory. This may include whether the electronic processor 205 is basing the planned trajectory on detected snow ruts or on lane markings on the road surface. In particular, the notification may provide an icon, light, color, or other indication when the vehicle guidance system 105 is planning the trajectory based on snow ruts and another indication when the vehicle guidance system 105 is planning the trajectory based on lane markings. The notification may also indicate whether the vehicle guidance system 105 is performing automated maneuvers or lane keeping assist.

Thus, embodiments of the disclosure provide, among other things, a system and method for planning a trajectory of a vehicle using snow ruts detected within camera images.

It should be noted that this disclosure includes references to "one embodiment," "an embodiment," and "some embodiments," which do not necessarily refer to the same embodiment. Particular features, structures, or characteristics may be combined in any suitable manner consistent with this disclosure.

What is claimed is:

1. A method of planning a trajectory for a vehicle, the method comprising:

sensing a road surface in front of the vehicle with a camera;

determining whether the road surface is snow covered based on images from the camera;

when the road surface is snow covered, determining whether snow ruts are present on the road surface based on the images;

planning a trajectory of the vehicle based on a location and a direction of the snow ruts in the images when the snow ruts are present, wherein the planned trajectory keeps one or more tires of the vehicle within the snow ruts; and automatically maneuvering the vehicle, via an electronic processor, based on the planned trajectory to keep the one or more tires of the vehicle within the snow ruts.

2. The method according to claim 1, further comprising:

determining whether lane markings on the road surface are visible in the images, and planning the trajectory of the vehicle based on a location of the lane markings in the images when the lane markings are visible in the images.

3. The method according to claim 2, further comprising:

determining when the snow ruts and the lane markings are not visible on the road surface and disabling automatic maneuvering of the vehicle, when the snow ruts and the lane markings are not visible on the road surface.

4. The method according to claim 1, wherein determining whether snow ruts are present on the road surface based on the images includes identifying two primary snow ruts out of two or more snow ruts, and planning the trajectory of the vehicle based on a location of the two primary snow ruts in the images.

5. The method according to claim 1, wherein planning the trajectory of the vehicle based on the location of the snow ruts in the images includes planning the trajectory based on a location of a preceding vehicle.

6. The method according to claim 1, wherein planning the trajectory of the vehicle based on the location of the snow ruts in the images includes planning the trajectory only in an area defined by a route selection using a vehicle navigation device.

7. The method according to claim 6, wherein planning the trajectory only in an area defined by a route selection using a vehicle navigation device includes determining a location of the vehicle using a Global Positioning System (GPS) and planning the trajectory to not exceed a predetermined distance threshold from a known location of the road surface.

8. The method according to claim 1, wherein automatically maneuvering the vehicle, via an electronic processor, based on the planned trajectory includes providing lane keeping support to adjust a current trajectory selected by a driver based on the planned trajectory.

9. The method according to claim 1, wherein automatically maneuvering the vehicle, via an electronic processor, based on the planned trajectory includes automatically steering the vehicle to follow the planned trajectory.

10. The method according to claim 2, further comprising: generating a notification to a driver of the vehicle, the notification indicating whether the electronic processor is planning the trajectory based on the snow ruts on the road surface or based on the lane markings on the road surface.

11. A system for planning a trajectory for a vehicle, the system comprising:

a camera positioned with a field of view of a road surface in front of the vehicle;

a vehicle control device configured to automatically maneuver the vehicle; and an electronic processor communicatively coupled to the camera and the vehicle control device, the electronic processor configured to receive images from the camera;

determine whether the road surface is snow covered based on the images;

when the road surface is snow covered, determine whether snow ruts are present on the road surface based on the images;

plan a trajectory of the vehicle based on a location and a direction of the snow ruts in the images when the snow ruts are present, wherein the planned trajectory keeps one or more tires of the vehicle within the snow ruts; and automatically maneuver the vehicle based on the planned trajectory to keep the one or more tires of the vehicle within the snow ruts.

12. The system according to claim 11, wherein the electronic processor is further configured to determine whether lane markings on the road surface are visible in the images, and plan the trajectory of the vehicle based on a location of the lane markings in the images when the lane markings are visible in the images.

13. The system according to claim 12, wherein the electronic processor is further configured to determine when the snow ruts and the lane markings are not visible on the road surface, and disable automatic maneuvering of the vehicle, when the snow ruts and the lane markings are not visible on the road surface.

14. The system according to claim 11, wherein the electronic processor is further configured to identify two primary snow ruts out of two or more snow ruts, and plan the trajectory of the vehicle based on a location of the two primary snow ruts in the images.

15. The system according to claim 11, wherein the electronic processor is further configured to plan the trajectory based on a location of a preceding vehicle.

16. The system according to claim 11, wherein the electronic processor is further configured to plan the trajectory only in an area defined by a route selection using a vehicle navigation device.

17. The system according to claim 16, wherein the electronic processor is further configured to determine a location of the vehicle using a Global Positioning System (GPS) and plan the trajectory to not exceed a predetermined distance threshold from a known location of the road surface.

18. The system according to claim 11, wherein the electronic processor is further configured to provide lane keeping support to adjust a current trajectory selected by a driver based on the planned trajectory.

19. The system according to claim 11, wherein the electronic processor is further configured to automatically steer the vehicle to follow the planned trajectory.

20. The system according to claim 12, wherein the electronic processor is further configured to generate a notification to a driver of the vehicle, the notification indicating whether the electronic processor is planning the trajectory based on the snow ruts on the road surface or based on the lane markings on the road surface.

* * * * *